United States Patent Office 3,428,580
Patented Feb. 18, 1969

3,428,580
SELF-EXTINGUISHING ORGANOPOLYSILOXANE
FOAMS
Siegfried Nitzsche, Rudolf Riedle and Gerhard Hombergs-
meier, Burghausen, Upper Bavaria, Germany, assignors
to Wacker-Chemie G.m.b.H., Munich, Germany
No Drawing. Filed Sept. 16, 1965, Ser. No. 487,914
Claims priority, application Germany, Sept. 18, 1964,
W 37,575
U.S. Cl. 260—2.5        10 Claims
Int. Cl. C08g 47/02

ABSTRACT OF THE DISCLOSURE

A self-extinguishing silicone resin foam consisting essentially of (1) an organosiloxane polymer free of hydrogen to silicon bonds, (2) a fluid organohydrogen siloxane polymer, (3) a hydroxyl group containing compound and (4) a catalyst.

---

This invention relates to a novel room temperature foaming and curing organosiloxane resin foam and a composition and method for producing such foam.

Foams produced from organosiloxane polymers are known. These foams are generally known as "silicone" foams and vary from elastomeric fine celled materials and rigid or resinous fine celled materials to elastomeric and resinous coarse foams or sponges. The known resinous foams prepared at room temperature are prepared from mixtures of organosiloxane polymers essentially free of hydrogen bonded to silicon and have an organic substituent to silicon ratio in the range from 0.9/1 to 1.8/1, organosiloxane polymers containing hydrogen bonded to silicon and compounds containing hydroxyl groups in the presence of foaming and curing catalysts such as quaternary ammonium compounds and carboxylic acid salts of heavy metals. The foams produced from this mixture are acceptable for many uses but they suffer a serious deficiency in that they are flammable and are not self-extinguishing unless antimony oxide or a chlorohydrocarbon is added to them. The known "snuffer" additives employed to impart self-extinguishing properties to such foams are undesirable, however, because they impair the density, heat conductivity and other physical and chemical properties of the foams.

It is the object of this invention to introduce a novel organosiloxane foam. Another object is a silicone resin foam which is formed and cures at room temperature. A further object is a silicone resin foam which is self-extinguishing in the absence of flame inhibiting or flame snuffing additives. A foam of superior physical and chemical properties is also an object of this invention. Other objects and advantages of this invention are detailed in or will be apparent from the disclosure and claims following.

The silicone resin foams of this invention are based on organosiloxane polymers and are prepared by admixing (1) an organosiloxane polymer essentially free of silicon bonded hydrogen atoms and containing an average of from 0.9 to 1.9 organic radicals per silicon atom, said polymer characterized by the general unit formula

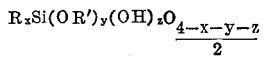

where R is $CH_3$ or $C_6H_5$, at least 90 percent of the R groups being $CH_3$, R′ is an alkyl radical of less than 5 carbon atoms, $x$, $y$ and $z$ are 0, 1, 2 or 3, $x+y+z$ does not exceed 3, and in the polymer molecule $x$ has an average value of 0.9 to 1.3, $y$ has an average value of 0.01 to 0.20 and $z$ has an average value of 0.02 to 0.20, (2) an organohydrogensiloxane polymer and (3) a monomeric or polymeric compound having non-acidic, reactive hydroxyl groups in the presence of (4) quarternary ammonium compounds or carboxylic acid salts of heavy metals.

The organosiloxane polymers (1) which are essentially free of hydrogen bonded to silicon (i.e. they have not detachable $HSi\equiv$ groups) are unique for the preparation of silicone resin foams in that they contain 90 to 100% of methyl radicals. The heretofore employed silicone resin foams required high proportions of phenyl substituents in the siloxane polymer. The presence of large proportions of phenyl substituents in the prior art silicone foams was for the purpose of reducing the flammability of the product. It was to be expected the flammability of the foam would increase as the phenyl content was reduced and, conversely, as the methyl content was increased. Thus it is most unexpected to discover a silicone resin foam formulation containing 90–100 percent of methyl substituents and characterized by self-extinguishing or non-flammable properties.

The basic siloxane polymer (1) employed herein can be described as an alkoxyhydroxymethylsiloxane or an alkoxyhydroxymethylphenylsiloxane polymer. The units present in such polymer are essentially monoorgano- and diorgano-substituted siloxane units but minor proportions of $SiO_{4/2}$ and triorgano substituted siloxane units can be present. It is preferred that not more than 30 percent of the units present be $R_2SiO$ and/or $R_3SiO_{1/2}$ units and the $SiO_{4/2}$ units should not exceed about 2 percent of the total number of units present. Thus the preferred siloxane polymer contains at least 70 percent of monoorganosiloxane units (i.e. $x=1$) and up to 30 percent of diorgano- and/or triorganosiloxane units (i.e. $x=2$ or 3). These operable siloxane polymers can vary widely as to degree of polymerization (i.e. average number of siloxane units per polymer molecule). Polymers in the viscosity range from about 1 cs. to 100,000 cs. at 25° C. can be employed but it is preferred to employ polymers having a viscosity not exceeding 1000 cs. at 25° C. when in a 50% by weight toluene solution. In general, those siloxane units wherein $x$ is 2 are free of —OR′ and —OH groups and of course those units where $x$ is 3 must be free of such other groups. The —OR′ groups can be methoxy, ethoxy, n-propoxy, isopropoxy, n-butoxy, sec-butoxy and isobutoxy but the $CH_3O$— and $C_2H_5O$— groups are preferred.

The alkoxy hydroxy organosiloxane polymers described by the unit formula above are prepared by known procedures. One method for preparing such polymers comprises subjecting an appropriate mixture of chlorosilanes to partial alcoholysis followed by hydrolysis and condensation. Thus a mixture of $RSiCl_3$, $R_2SiCl_2$, $R_3SiCl$ and/or $SiCl_4$ wherein R is as restricted above and the average ratio of R/Si is in the range defined for $x$ is reacted with an alcohol of the formula R′OH, where R′ is as defined above, the ratio of reactants being such that there is 0.01 to 0.95 mols of alcohol per gram atom of silicon bonded chlorine. The resulting organoalkoxychlorosilane mixture is then hydrolyzed to replace the remaining chlorine and, optionally, some of the alkoxy groups with —OH groups, some of which will then condense to form siloxane linkages. Any or all of these reactions can be carried out with catalysts, HCl acceptors, etc. as is well known in the art. Further, the use of organic solvents and processing techniques is to be expected. The method of preparing these alkoxy hydroxy organosiloxane polymers is not critical.

The hydrogenorganosiloxane polymers (2) employed herein can be defined by the general unit formula

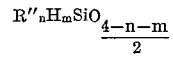

where R″ is —$CH_3$ or —$C_6H_5$, a sufficient proportion of R″ being methyl radicals to insure that the number of phenyl radicals in the foam mixture does not exceed 10 percent of the total organic groups bonded to silicon, $n$ and $m$ are each 0, 1, 2 or 3 and $n+m$ does not exceed 3 for each unit and in the polymeric molecule $m$ has an average value in the range from 0.33 to 1.25 and $n$ has an average value in the range from 0.7 to 1.3. The best known and commercially available organohydrogensiloxane is methylhydrogensiloxane of the unit formula $CH_3SiHO$.

The organohydrogensiloxane can be linear such as $HO(R''HSiO)_aH$, $R''_3SiO[R''HSiO]_aSiR''_3$,

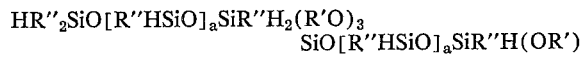

etc. and some of the $R''HSiO$ units can be replaced with $R_2SiO$ units as in $HO[R''HSiO]_a[R_2SiO]_bSiR''$. Further, the organohydrogensiloxane can be a cyclic polymer as in $[CH_3SiHO]_c$ where $c$ is 3, 4, 5 or a larger integer. Of course, mixtures of cyclic and linear polymeric species can be employed. These are not new siloxane polymers and their use in a variety of materials such as textile water repellants and room temperature vulcanizing rubbers is well known. Methods of preparing such polymers are old and need not be enumerated or explained herein for those skilled in the art.

The organohydrogensiloxane polymer can be employed in proportions of from 1 to 100 percent by weight of Si atoms with at least one H bonded to Si for each Si atom in the foam mixture free of Si-bonded hydrogen. It is preferred to employ the organohydrogensiloxanes in quantities of 2 to 20 percent by weight on the stated basis.

As is well known in the siloxane resin foam art, the organosiloxane polymer (1) which is free of silicon bonded hydrogen and/or the organohydrogensiloxane polymer (2) can also function as the non-acidic, the reactive hydroxyl group containing compound (3) providing the siloxane (1) and/or organohydrogen siloxane (2) contains a sufficient proportion of hydroxyl groups bonded to Si. However, in general a hydroxylated compound must be added. For this purpose, low molecular weight organosilanols and organosiloxanols have been found to be useful. Other hydroxyl containing compounds useful as ingredient (3) herein include water, organic alcohols such as ethanol, butanols, ethylene glycol, propylene glycol, diethylene glycol, polyalkylene glycols, glycerine, and pentaerythritol, alkanolamines such as ethanolamine and triethanolamine, hydroxy carboxylic acid esters and polyesters displaying residual OH groups, cyanhydrins and alcohols containing halogen, nitro and other non-acidic functional groups. It is preferred that the foam mixtures of this invention contain at least 0.5 percent by weight and not more than 50 percent by weight of —OH groups, calculated on the total weight of organohydrogensiloxane polymer plus hydrogen free organosiloxane polymer.

The catalysts employed herein can be any quaternary ammonium compounds. Preferred ammonium compounds are hydroxides of the general formula $R'''_4NOH$ and alkoxides of the general formula $R'''_4NOR'$ where $R'$ is as defined above and $R'''$ is an aliphatic hydrocarbon radical such as alkyl radicals (e.g. $C_dH_{2d+1}$ where $d=1-18$) alkenyl radicals (e.g. vinyl, allyl, hexenyl and octadecenyl), cycloalkyl such as cyclohexyl, cyclopentyl and cyclooctadecenyl, cycloalkenyl such as cyclohexenyl; an aromatic hydrocarbon radical such as phenyl, xylenyl, tolyl, biphenyl and ethylphenyl; or an alkaryl radical such as benzyl and beta-phenyl ethyl radicals. These radicals may be substituted with non-acidic functional groups such as hydroxyl groups hence $R'''$ can be, for example, hydroxyethyl, hydroxypropyl, hydroxycyclohexyl, hydroxyphenyl, hydroxytolyl and hydroxyallyl radicals. In addition to the quaternary ammonium compounds, the catalyst employed herein can be a carboxylic acid salt of a heavy metal. Preferred are the salts of divalent tin such as tin-(II)-octoate and tin-(II)-oleate. However, the quaternary ammonium hydroxides are most preferred for this purpose. The catalyst is employed in proportions from 0.001 to 30 percent by weight, more preferably 0.5 to 10 percent by weight, based on the total weight of siloxane polymers (1) and (2) present in the mixture.

The ingredients employed herein can be admixed in any desired manner and in any desired order. It is essential to obtain as homogeneous a mixture as is possible because the closer the mixture approximates a perfectly homogeneous material, the less dense will be the foam. The mixing, foaming and hardening (or curing) occur at 0°–30° C. and atmospheric pressure. One can merely mix the materials and the foam will form without further activity. The foam will generally foam and harden in place in a period of 10 seconds to 30 minutes, usually 0.5–15 minutes. The hardened foam can be cured, if desired, by heating above 30° C. but this is not considered to be necessary for most applications.

It has been found that the self-extinguishing properties and the formation of fine, uniform cell structure and low density as well as high mechanic stability are enhanced by employing linear or cyclic siloxane oils in the foam mixture. Such oils are defined by the general formulae $(CH_3)_3SiO[A_2SiO]_pSi(CH_3)_3$ and $(A_2SiO)_{p'}$ where A is $CH_3$, $CH_2=CH-$, or $C_6H_5$, $p$ is 0 or an integer and $p'$ is an integer. These polymers are preferably relatively low molecular weight, having a viscosity in the range from 0.65 to 300 cs. at 25° C. These polymers are employed in proportions from 0.5 to 10 percent by weight based on the total weight of siloxane polymers present in the mixture. Preferred as the low molecular weight linear siloxane oil are the methyl siloxane polymers defined by the above formulae wherein A is $CH_3$. Those methyl siloxane oils of 0.65 to 35 cs. viscosity at 25° C. are most preferred and give excellent results when employed in proportions from 0.5 to 5 percent based on the weight of siloxanes present in the mass.

If desired other additives conventionally employed in resinous foams can be employed herein. Fillers, stabilizers, catalysts, pore formers, pigments, dyes and additives to enhance specific physical and chemical properties are contemplated. Such materials as metal salts of carboxylic acids, amines, alkyl silicates, fluorinated chlorohydrocarbons such as fluorotrichloromethane, fillers such as metal powders and fibers including aluminum, tin and zinc powders, tin, aluminum and copper fibers, etc., silicas, mica, clays and metal oxides such as titania and iron oxide can be employed herein. The fillers should be employed in amounts not exceeding 20 weight percent and preferably less than 5 weight percent of the siloxanes present. Minor amounts, i.e. less than 20 weight percent, of solvents may be present.

The foams of this invention are as widely useful as the known uses for resinous foams. Preparation of construction elements, thermal and acoustic insulation of pumps, motors, conductors, containers, bath tubs, heating elements, ovens, etc. are proposed as uses for these materials. Fire walls and electrical insulation also are applications for these foams.

The following examples are included herein to provide specific embodiments of the claimed invention. The scope of the invention is delineated in the appended claims and is not restricted by the examples. All parts and percentages are based on weight unless otherwise specified, all viscosities are measured at 25° C. and all temperatures are on the centigrade scale.

The methylhydrogensiloxane polymer in these examples is a hydroxyl endblocked, linear methylhydrogensiloxane of 25 cs. viscosity at 25° C. The reactions were carried forward at room temperature (about 20° C.) and atmospheric pressure unless otherwise specified. The individual components were added in the order described. Density measurements and flammability testing were accomplished 24 hours after mixing the starting ingredients for production of the foam.

Example 1

A mixture was prepared in a high speed mixer employing 100 parts of a methylsiloxane polymer containing 95 mol percent monomethylsiloxane units and 5 mol percent dimethylsiloxane units with an OH/Si ratio of 0.08/1 and an ethoxy/Si ratio of 0.12/1 having a viscosity of about 500 cs., 6 parts methylhydrogensiloxane polymer and 2 parts of a 40 weight percent solution of tetra-n-butyl ammonium hydroxide in n-butanol. The mixture was poured into a container and a foam with a density of 0.12 g./cc. was formed. A test piece of the foam was held in the flame of a Bunsen burner for 20 seconds. The foam was then removed from the flame and the burning ceased, thus illustrating the self-extinguishing characteristic of these foams. The foam was then reinserted in the Bunsen burner flame and that portion of the foam directly in the flame burned to a silica ash but the structure of the foam was retained and the portion of foam not in the flame was not burned or otherwise affected.

Example 2

The method of Example 1 was repeated employing 100 parts of a copolymer of 90 mol percent monomethylsiloxane units and 10 mol percent of phenylmethylsiloxane units, having an OH/Si ratio of 0.09/1 and an ethoxy/Si ratio of 0.12/1, with a viscosity of 250 cs., 4 parts methylhydrogensiloxane polymer as in Example 1, and 4 parts of tetra-n-butyl ammonium hydroxide in n-butanol as in Example 1. The mixture was poured into a container and a foam with a density of 0.28 g./cm.³ was formed. This foam was tested in a Bunsen burner flame as in Example 1 with identical results.

Example 3

Employing the method of Example 1 a series of foams was prepared employing 100 parts of organosiloxane polymer having 90 mol percent of monomethylsiloxane units, 5 mol percent of monophenylsiloxane units and 5 mol percent of phenylmethylsiloxane units, having an OH/Si ratio of 0.16/1 and a methoxy/Si ratio of 0.08/1 and viscosity of 200 cs., a trimethylsiloxy endblocked diorganosiloxane polymer as defined and in the quantities set forth in Table I below, 2 parts of a 40 percent by weight solution of tetra-n-butyl ammonium hydroxide in ethanol and 6 parts methylhydrogensiloxane polymer. Foams were formed as described in the table. These foams were tested in the Bunsen burner flame as in Example 1 with identical results.

Example 4

Excellent foams were obtained employing the formulation of Example 3 when an equivalent amount of each of the following catalysts was substituted for the tetra-n-butyl ammonium hydroxide employed therein: tin octoate, tin oleate, zinc laurate, copper hexoate, antimony octoate, tetra alkyl ammonium methoxide, ethoxide or butoxide, tetra-vinyl ammonium hydroxide, tetra phenyl ammonium propoxide, tetra-b-hydroxy ethyl ammonium hydroxide or di-p-hydroxy phenyl methyl propyl ammonium hydroxide.

Example 5

Excellent foams were obtained employing a mixture of 100 parts of a copolymer of 90 mol percent $CH_3SiO_{3/2}$ units and 10 mol percent $(CH_3)_2SiO$ units having an OH/Si ratio of 0.02/1 and an ethoxy/Si ratio of 0.12/1 with a viscosity of 500 cs. at 25° C., 6 parts methyl hydrogen siloxane fluid, 1 part $(C_4H_9)_4NOH$ and 1 part of any of the following: water, ethyl alcohol, butyl alcohol, dimethylsilane diol, tetramethyldisiloxane diol, $HO[(CH_3)_2SiO]_4H$, ethanolamine, diethanolamine, ethylene and propylene glycol, glycerine and pentaerythritol.

TABLE I

| | Viscosity at 25° C., cs. | Quantity, parts | Foam Density, g./cm.³ | Cell Structure |
|---|---|---|---|---|
| Diorganopolysiloxane | | 0 | 0.240 | Coarse, longish. |
| Dimethylpolysiloxane | 35 | 0.5 | 0.205 | Medium, uneven. |
| Do | 35 | 2 | 0.170 | Fine, round. |
| Do | 350 | 1 | 0.185 | Medium, even. |
| Do | 4 | 2 | 0.155 | Very fine, round. |
| Phenylmethylpolysiloxane | 20 | 4 | 0.190 | Fine, round. |
| Vinylmethylpolysiloxane | 200 | 1 | 0.185 | Medium, longish. |

That which is claimed is:

1. A self-extinguising silicon resin foam composition consisting essentially of (1) an organosiloxane polymer essentially free of hydrogen bonded to silicon characterized by the general unit formula

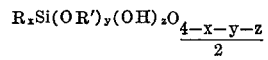

where each R is selected from the group consisting of methyl and phenyl radicals, at least 90 percent of the R groups being methyl radicals, each R' is an alkyl radical of less than 5 carbon atoms, x, y and z are each 0, 1, 2 or 3, x+y+z does not exceed 3, and in the polymer molecule x has an average value from 0.9 to 1.3, y has an average value of 0.01 to 0.20, and z has an average value of 0.02 to 0.20, (2) a fluid organohydrogen siloxane polymer, (3) a compound having non-acidic reactive hydroxyl groups and (4) a catalyst selected from the group consisting of quaternary ammonuim compounds and carboxylic acid salts of heavy metals.

2. The foam compositions in accordance with claim 1 further characterized in that they contain (5) a siloxane oil selected from the group consisting of linear siloxane polymers of the general formula

and cyclic siloxane polymers of the formula $(A_2SiO)_{p'}$ where each A is selected from the group consisting of methyl, vinyl and phenyl radicals, p is 0 or an integer and p' is an integer such that the viscosity of the siloxane oil is in the range from 0.65 to 300 cs. at 25° C.

3. The foam composition of claim 1 further characterized in that the organosiloxane polymer (1) contains at least 70 mol percent of monoorganosiloxane units and up to 30 mol percent of units selected from diorganosiloxane units and triorganosiloxane units.

4. The foam composition of claim 1 further characterized in that the siloxane polymer (1) has a viscosity in the range from 1 to 100,000 cs. at 25° C.

5. The foam composition of claim 1 further characterized in that the organohydrogensiloxane polymer (2) is defined by the general unit formula

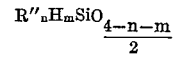

where R" is selected from the group consisting of methyl and phenyl radicals, at least 90 percent of the R" substituents being methyl radicals, n and m are each 0, 1, 2 or 3, n+m does not exceed 3 for each unit and in the polymeric molecule n has an average value from 0.7 to 1.3 and m has an average value from 0.33 to 1.25 and said organohydrogensiloxane polymer is employed in proportions of from 1 to 100 parts by weight of HSi units per each 100 parts by weight of non-hydrogen containing siloxane units present.

6. The composition of claim 5 further characterized in that it contains 2 to 20 parts by weight methylhydrogensiloxane per 100 parts by weight of organosiloxane polymer (1).

7. The composition of claim 1 further characterized in that the hydroxyl containing compound (3) is selected from the group consisting of low molecular weight organosilanols, low molecular weight organosiloxanols, water, organic alcohols, alkanolamines, hydroxy-carboxylic acid esters, cyanhydrins and alcohols containing nitro groups, halogen atoms and non-acidic functional groups.

8. The compositions of claim 1 further characterized in that the catalyst (4) is selected from the group consisting of ammonium compounds of the formula R'''$_4$NOH and R'''$_4$NOR' and carboxylic acid salts of heavy metals, where R''' is selected from the group consisting of aliphatic hydrocarbon radicals, aromatic hydrocarbon radicals and hydroxy aliphatic and hydroxy aromatic hydrocarbon radicals, and each R' is an alkyl radical of less than 5 carbon atoms.

9. The foam composition of claim 2 further characterized in that the siloxane oil is a methylsiloxane polymer of 0.65 to 35 cs. at 25° C. and is present in proportion of from 0.5 to 5 percent by weight based on the total weight of siloxanes present in the mixture.

10. The foam composition of claim 1 further characterized in that the organosiloxane polymer (1) and the compound having non-acidic reactive hydroxyl groups (3) are satisfied by a single organohydroxylsiloxane polymer.

References Cited

UNITED STATES PATENTS 2,833,732  5/1958  Weyer.
3,338,847  8/1967  Nitzsche et al.

FOREIGN PATENTS 867,619  5/1961  Great Britain.

SAMUEL H. BLECH, *Primary Examiner.*

W. J. BRIGGS, Sr., *Assistant Examiner.*

U.S. Cl. X.R.

260—46.5, 825